US010544015B1

(12) United States Patent
Van Loon et al.

(10) Patent No.: US 10,544,015 B1
(45) Date of Patent: Jan. 28, 2020

(54) DEVICE AND METHOD FOR LIFTING AN OBJECT FROM A DECK OF A VESSEL SUBJECT TO MOVEMENTS (71) Applicant: GeoSea N.V., Zwijndrecht (BE)

(72) Inventors: Jeroen Van Loon, Turnhout (BE); Dieter Wim Jan Rabaut, Ghent (BE)

(73) Assignee: GeoSea N.V., Zwijndrecht (BE)

( * ) Notice: Subject to any disclaimer, the term of this patent is extended or adjusted under 35 U.S.C. 154(b) by 0 days.

(21) Appl. No.: 16/031,362

(22) Filed: Jul. 10, 2018

(51) Int. Cl.
B66C 23/52 (2006.01)
B66C 13/06 (2006.01)
B66C 23/18 (2006.01)
F03D 13/25 (2016.01)
E02B 17/00 (2006.01)
B63B 35/00 (2006.01)

(52) U.S. Cl.
CPC .............. B66C 23/52 (2013.01); B66C 13/06 (2013.01); B66C 23/185 (2013.01); F03D 13/25 (2016.05); B63B 35/00 (2013.01); E02B 2017/0047 (2013.01); E02B 2017/0091 (2013.01)

(58) Field of Classification Search
CPC ....... B66C 23/52; B66C 13/06; B66C 23/185; F03D 13/25; E02B 2017/0091; E02B 2017/0047; B63B 35/00; B66F 17/00
USPC ....... 414/141.6, 138.2, 745.1–746.8; 410/44; 212/275
See application file for complete search history.

(56) References Cited

U.S. PATENT DOCUMENTS

| 3,175,693 | A | * | 3/1965 | Steel | B65G 1/07 100/7 |
| 4,174,188 | A | * | 11/1979 | Brun | B66C 13/02 212/308 |
| 4,395,178 | A | * | 7/1983 | MacDonell | B63B 27/30 114/259 |
| 5,188,503 | A | * | 2/1993 | Appelberg | B21D 43/006 211/49.1 |
| 5,577,875 | A | * | 11/1996 | Nanzai | B62B 3/0612 212/279 |
| 7,152,547 | B1 | * | 12/2006 | Hovland | B63B 17/00 114/261 |
| 8,911,178 | B2 | * | 12/2014 | Vanderbeke | E02B 17/027 405/209 |
| 9,487,277 | B2 | * | 11/2016 | van der Tempel | B63B 17/00 |
| 2010/0067989 | A1 | * | 3/2010 | Brown | B63B 27/02 405/196 |

(Continued)

Primary Examiner — Lynn E Schwenning
(74) Attorney, Agent, or Firm — Renner, Otto, Boisselle & Sklar, LLP (57) ABSTRACT Described is a device for lifting an elongated object from a deck of a vessel subject to movements in a heave direction. The device comprises rigid supports provided on the deck of the vessel for supporting the object at a first height relative to the deck, and retractable supports provided on the deck of the vessel for supporting the object at a second height relative to the deck, which second height is larger than the first height. A lifting crane is configured to take up the object from the retractable supports at the second height. An actuator system is configured to lower the retractable supports in the heave direction to a third height relative to the deck at the instant in time the object is lifted from the retractable supports, the third height being smaller than the second height. A method using the device is also described.

21 Claims, 8 Drawing Sheets (56) References Cited

U.S. PATENT DOCUMENTS

| | | | |
|---|---|---|---|
| 2011/0170988 A1* | 7/2011 | Perry | B63B 27/30 414/138.2 |
| 2012/0027523 A1* | 2/2012 | Vanderbeke | E02B 17/021 405/195.1 |
| 2014/0045394 A1* | 2/2014 | Woldring | B63B 21/20 441/3 |
| 2014/0161568 A1* | 6/2014 | De Jong | B66F 3/00 414/21 |
| 2014/0305743 A1* | 10/2014 | Poulsen | B65G 1/0442 187/244 |
| 2017/0096196 A1* | 4/2017 | Foo | B63B 27/30 |

* cited by examiner

DEVICE AND METHOD FOR LIFTING AN OBJECT FROM A DECK OF A VESSEL SUBJECT TO MOVEMENTS

TECHNICAL FIELD OF THE INVENTION

The invention relates to a device and method for lifting an elongated object from a deck of a vessel subject to movements in a surge, sway and heave direction. The invention relates particularly to a device and method for lifting a component of a wind turbine from a deck of a vessel subject to movements.

BACKGROUND OF THE INVENTION

The invention will be elucidated with reference to components of an offshore wind turbine. The reference to such a wind turbine does not however imply that the invention is limited thereto, and the device and method could be applied for lifting any other object, such as for instance used for offshore foundation structures, jetties, radar and other towers, and the like.

A vessel in a water mass is subject to movements according to six degrees of freedom. Translational movements comprise heave, sway and surge. Where heave is a vertical movement, sway is the side to side or port to starboard movement and surge is the front to back or bow to stern movement. Rotational movements comprise pitch, roll and yaw. Where pitch is a rotation of a vessel about its lateral (port-starboard) axis, roll is the rotation about its longitudinal (bow-stern) axis, and yaw is the rotation about its vertical axis. Heave, sway, surge, pitch, roll and yaw movements are defined in a coordinate system fixed to the floating vessel and therefore may differ from movements in the vertical and two horizontal directions, defined by a coordinate system fixed to the outside world.

The motions of the water mass are transferred to a vessel that is floating in the water mass. The induced vessel movements, in turn, impose movements and accelerations on objects that are transported by the vessel or manipulated on the vessel. When lifting an object from a deck of a floating vessel with a crane for instance, the relative movement between the floating vessel and the object during the lifting operations may cause the object to re-hit with parts of the vessel, or with another structure on the vessel. This is especially the case when the lifting crane is not provided on the floating vessel itself, but is provided on another floating vessel and/or on a stabilized vessel or other platform, such as a jack-up platform that is separate from the object's vessel. Re-hitting the object with the floating vessel could damage the lifted object, parts of the vessel, both, or other items in the vicinity of the lifted object. For instance, after a re-hit, the object may be subject to uncontrolled swinging movements.

According to the state of the art, the risk for a re-hit of the lifted object with the vessel during lifting may be avoided by providing a system that is configured to actively compensate movements of the object relative to the deck of the vessel. Such a system may for instance compensate two rotational movements (pitch and roll) and one translational (heave) movement of the vessel in order for a platform carrying the object to stay substantially horizontal at a fixed height relative to an outside world reference system while the vessel is moving in pitch, roll, and heave directions underneath. The known active compensation system is operable in conjunction with a fixed crane, typically provided on the deck of a jack-up platform, separate from the floating vessel carrying the objects to be lifted. The active compensation will hold the platform and the object on top of the platform substantially stationary relative to the fixed crane. The legs of the jack-up vessel provide the required stability.

Although the known system may be used in some circumstances, it lacks flexibility. It cannot be used for larger objects. Also, the active compensation has to be operable before, during and after lifting, and the risk for material and personal damage is substantial should the compensation for some reason fail temporarily.

SUMMARY OF THE INVENTION

It is an aim of the invention to provide a device and method that may limit the above mentioned risk for a re-hit in an efficient and fail-safe manner. Another aim is to provide a device and method that makes it possible to safely lift objects offshore from a deck of a vessel, in particular a floating vessel.

Provided for this purpose according to the invention is a device in accordance with claim 1. The device is suitable for lifting an elongated object from a deck of a vessel, subject to movements in a heave direction, and comprises:

rigid supports provided on the deck of the vessel for supporting the object at a first height relative to the deck;

retractable supports provided on the deck of the vessel for supporting the object at a second height relative to the deck, which second height is larger than the first height;

a lifting crane configured to take up the object from the retractable supports at the second height; and an actuator system configured to lower the retractable supports in the heave direction to a third height relative to the deck at an instant in time the object is lifted from the retractable supports, the third height being smaller than the second height.

The invention enables increasing the workable sea states for lifting objects from a deck of a floating vessel without having a re-hit, and without having to use complex continuous active compensation systems. Workable sea states for lifting without re-hit without any compensation system may be defined by the specifics (geometry and weight) of the object to be lifted, by the engineered Dynamic Amplification Factor (DAF) to be taken into account to ensure safe lifting operations, by the lifting speed of the crane and by the specifics of the floating vessel, including the loading configuration of the vessel.

The invention may be envisaged as an artificial increase of the lifting speed of the used lifting crane. The relative speed and acceleration that occurs between the lifted object and the retractable supports indeed is increased upon lifting by introducing retractable supports for the object to be lifted on the vessel that are able to retract in a heave direction towards the deck of the floating vessel as soon as the object is lifted from the retractable supports. Retraction in the heave direction towards the vessel's deck occurs in a sense that is opposite to the sense of the lifting direction, which is away from the deck of the vessel.

The instant in time of lifting may for instance be detected when a substantial part of the weight of the object, up to the complete weight of the object, is transferred from the retractable supports to the lifting crane. The lowering or retraction speed of the retractable supports is in this manner actually added to the lifting speed of the crane. This considerably reduces the risk of a re-hit, in particular in case of an upward movement of the deck of the vessel in the vertical direction as caused by heave, pitch or roll of the vessel.

An embodiment of the invention provides a device comprising a detector configured to determine the instant in time, i.e. the moment the object is lifted off the retractable supports.

As already mentioned above, a vessel when floating on water, is subjected to movements exhibiting 6 degrees of freedom, including three translational movements and three rotational movements. In a Cartesian coordinate system linked to a vessel, and defining the z-axis as extending vertically, the x-axis as extending in a longitudinal direction of the vessel and the y-axis as extending in a transverse direction of the vessel, an x-axis translational movement is referred to in the art as surge, a y-axis translational movement as sway, and a z-axis translational movement as heave. A rotational movement of the vessel around the x-axis is referred to as roll, a rotation around the y-axis as pitch, and a rotation of the vessel around the z-axis as yaw. Notably, the (x,y)-plane formed by the deck of the vessel will not be parallel to a plane extending parallel to the underwater bottom motion, due precisely to the vessel's motion on the water. The invented device particularly operates in the heave or z-direction of the vessel.

A suitable lowering or retraction speed of the retractable supports and retraction distance or height may be determined on a case by case basis to achieve a scenario specific sea state to work in and to achieve accompanied workability for the lifting operations.

The invention may be used for lifting any elongated object. Examples of such objects comprise but are not limited to turbine components, such as tower (parts), full towers, split tower sections (for instance two or three sections), blades; wind turbine foundation components such as monopiles, transition pieces and all types of jacket foundations; and general items, such as but not limited to offshore wind turbine (foundation) installation equipment, and spare vessel and equipment parts. The weight of the objects is immaterial to the invention but objects weighing 350 tons (a split tower section for instance) and up to 1600 tons (a monopile for instance) and more, may be lifted with the support of the invented device.

The lifting point or points may be located everywhere on the object to be lifted. The elongated object may also be lifted by taking it up at a suitable lifting area of the object. This area (or areas) may be located everywhere on the object to be lifted. An elongated object may be supported by the rigid supports provided on the deck of the vessel in a substantially horizontal position, i.e. about parallel to the vessel's deck. Such an elongated object may be conveniently lifted by providing a suspension frame and slings, and hang the object in the slings. The lifting areas in such embodiment are preferably provided such that the object is in a substantial equilibrium when hanging in the slings.

According to an embodiment of the invention, the rigid supports are provided to support end parts of the object, and the retractable supports are provided in positions between the rigid supports. The number of retractable supports may be chosen according to the needs such as the weight and length of the object to be lifted.

According to an embodiment of the invention, the rigid supports are connected to the deck such as to substantially prevent its movements relative to the deck in the sway, surge and heave directions. In this embodiment, the rigid supports are connected to the deck such that it substantially moves together with movements of the deck of the vessel in the sway, surge and heave directions.

According to an embodiment of the invention, the retractable supports are connected to the deck such as to substantially prevent its movements relative to the deck in the sway, surge and heave directions. Nevertheless as per definition of the retractable supports, parts of the retractable supports are able to move in a heave direction relative to the vessel's deck. In this embodiment, the retractable supports are connected to the deck such that it substantially moves together with movements of the deck of the vessel in the sway, surge and heave directions.

According to an embodiment of the invention, the rigid supports are connected to the deck such as to substantially prevent movement of the object provided at the first height relative to the deck in sway and/or surge and/or heave directions of the vessel or any non-zero acute angle with the surge and/or sway directions. At the first height the movement of the object in a heave direction can be prevented by the natural weight of the object itself, but can also be actively prevented by an incorporated system to keep the object in place in the heave direction. In this embodiment, the rigid supports are connected to the deck such that an object at the first height provided in (or on) the rigid supports substantially moves together with movements of the deck of the vessel in the sway and/or surge and/or heave directions or any other non-zero acute angles of the sway and/or surge directions.

According to an embodiment of the invention, the rigid supports are connected to the deck such as to substantially prevent movement of the object provided at the second height relative to the deck in a surge and/or sway direction of the vessel or any non-zero acute angle with the surge and/or sway directions. At the second height the movements of the object in a heave direction will be prevented by the natural weight of the object itself. In this embodiment, the rigid supports are connected to the deck such that an object at the second height provided in (or against) the rigid supports substantially moves together with movements of the deck of the vessel in the sway and/or surge directions or other non-zero acute angles with these directions. This may for instance be achieved by providing rigid supports that are still in contact with the object provided at the second height at least in the sway and/or surge directions or other non-zero acute angles with these directions. When the retractable supports lift the object from the first height to the second height, the weight of the object will be transferred from the rigid supports onto the retractable supports.

The first height of the object, as provided by the rigid supports carrying the object, may be above deck. The (larger) second height of the object, as provided by the retractable supports carrying the object, will then also be above deck. The third height of the retractable supports in the retracted position may be below deck but are preferably also above deck, albeit at a lower height than the second height.

The retraction height capability of the (retractable supports of the) device, i.e. the difference between the second and the third height the device is capable of bridging, may be determined according to known engineering practices for each specific lifting operation. The invented device provides the flexibility to be custom built according to a client's needs taking into account the specific vessel from which it has to operate, the specific maximum dimensions and weight of the object to be lifted, operational crane limitations, and the sea states in which one would like to safely operate. By performing a motion analysis for all the specific lifts, a worst case scenario may be identified and the maximum retraction height and retractable supports size of the device may be defined. Such a scenario also makes the device suitable and fail proof for lifting less critical objects.

Useful embodiments of the invention provide a device wherein the difference between the second and the third height (the retraction height capability) is larger than 0.5 m, more preferably larger than 0.75 m, even more preferably larger than 1 m, even more preferably larger than 1.25 and most preferably larger than 1.5 m. In other useful embodiments, the retraction height capability is smaller than 3 m, even more preferably smaller than 2.5 m, even more preferably smaller than 2.0 m, and most preferably smaller than 1.75 m.

The lowering speed of the retractable supports may also be chosen within a large range, depending on the circumstances at hand, for instance dependent on the maximum lifting speed offered by the lifting crane. An embodiment of the invention provides a device wherein the lifting crane has a maximum lifting speed, and the actuator system of the device is configured to lower the retractable supports at a lowering speed larger than 10% of the maximum lifting speed, more preferably larger than 25% of the maximum lifting speed, and even more preferably larger than 50% of the maximum lifting speed.

The retraction or lowering of the retractable supports from the second height to the third height preferred occurs relatively fast in order to avoid any collision or re-hit of the lifted object with parts of the vessel, which may also be the rigid supports or the retractable supports themselves. A useful embodiment thereto provides a device wherein the actuator system is configured to lower the retractable supports at a lowering acceleration of larger than 10% of the gravitational acceleration, more preferably larger than 25% of the gravitational acceleration, even more preferably larger than 50% of the gravitational acceleration, and most preferably substantially equal to, or even larger than, the gravitational acceleration.

The retractable supports are referred to as 'retractable' because these supports may move a support surface for the object in the heave direction of the floating vessel. The feature of 'retractable' does not mean that the retractable supports should be able to move across the deck of the vessel in other directions, such as the surge and sway directions.

The retractable supports may each be lowered and lifted at their own independent acceleration and speed. An embodiment wherein the actuator system is configured to lower and raise the retractable supports at an acceleration and speed that is substantially equal for all retractable supports is preferred however.

In a practical embodiment of the device according to the invention, the actuator system comprises distance-varying means provided between the retractable supports and a base surface such as provided by the deck of the vessel, and configured to vary the distance in the heave direction between the retractable supports and the base surface. The base surface provides a substantially rigid support for the distance-varying means and allows those means to 'push' movable parts of the retractable supports and an object positioned thereon away from the base surface. The base surface absorbs the object's weight, transmitted by the retractable supports and the distance varying means to the vessel's load bearing structure.

A convenient embodiment provides distance-varying means comprising cylinder-piston units.

In a useful embodiment of the invention, the retractable supports each comprise a pair of posts positioned at opposite sides of a centerline of the object, and carrying a sling provided between the pair of posts for supporting the object. The sling may be connected to a connection point on a post or other part of the deck, may run over a pulley, provided at a top end of the post, may then be provided underneath the object and made to surface at the opposite side of the object's centerline to be led to a second post of the pair of posts, may then run over a pulley, provided at a top end of the second post, and down to a connection point provided on said second post or another part of the deck. In this embodiment, the object may be brought to the second height by extending the distance-varying means to enlarge the vertical distance between the connection point and the pulley for each post. Alternatively, the sling may be lowered away from the lifted object by to the third height by retracting the distance-varying means to diminish the vertical distance between the connection point and the pulley for each post. In other words, the pulleys are brought towards the deck of the vessel.

Conveniently, the distance-varying means are incorporated in the posts in some embodiments.

The actuator system of the invention according to some embodiments at least comprises the retractable supports the distance varying-means acting to lower or lift the retractable supports relative to the vessel's deck. Another useful embodiment relates to a device wherein components of the actuator system are interlinked by a hydraulic system comprising a pump or high pressure unit and/or accumulator. The hydraulic system may comprise cylinder-piston units as distance-varying means. Such cylinder-piston-units typically comprise a piston side and a pressure side, the latter being hydraulically connected to a pump or accumulator for pressurizing the cylinder-piston units. Pressurizing the cylinder-piston units causes the piston to extend from the cylinder, whereas depressurizing causes the piston to retract.

Yet another embodiment relates to a device wherein the deck supports a plurality of rigid and retractable supports that are aligned to support one elongated object. This embodiment allows storing and securing a plurality of objects on the vessel.

In another embodiment of the invention, a device is provided wherein the retractable supports may be moved over the deck of the vessel, for instance by providing them with wheels, configured to wheel over rails provided on the deck.

According to an embodiment of the invention, the device comprises a detector configured to determine the instant in time at which the object is lifted from the retractable supports. Any device, person or method known in the art may be used for this purpose. It is for instance possible to detect the instant in time at which the object is lifted from the supports by a human operator, for instance the operator of the lifting crane. It is also possible that the detector comprises optical means, such as a camera directed to the retractable supports. A useful embodiment of the invention provides a device wherein the detector comprises a force sensor provided in the retractable supports. A force sensor, or a plurality of force sensors, provided in the retractable supports will detect a force when an object is supported by the retractable supports at the second height. Such force will decrease to a negligible or nil value when an object has left the retractable supports. Measuring the force therefore yields information about the instant in time at which the object is lifted from the surface. Another embodiment may use a load measuring system provided in the lifting crane. When the total or a predefined part of the object's weight is actually registered by the crane load measuring system, this will correspond to the instant in time of lifting.

The output of the detector causes a control signal to the actuator system of the invented device to retract the retractable supports. The control signal may be transmitted by any means in the art, such as by a wireless system for instance.

Yet another embodiment relates to a device wherein a monitoring means is configured to determine the optimal instant in time at which the object is to be lifted by monitoring the periodic movements of the vessel at the location of the object in the vertical direction. Such monitoring means are known per se and may comprise an accelerometer and/or gyroscope and/or motion reference unit and/or other sensors. Preferably, the monitoring means are configured to determine a maximum height of the vessel at the location of the object in the vertical direction. It may then be desirable to initiate the lifting operation at an instant in time at which the floating vessel at the location of the object experiences a maximum height in the vertical direction in its periodic movement.

The aim of the optional monitoring means is to foresee the instant in time at which the lifting operation is preferably initiated, or, in other words, to determine the intended instant in time for lifting. The aim of the optional detector is to actually determine this instant in time.

The device of the invention may be operated by an operator of the vessel, the crane or any other component of the device. For instance, an operator of the crane may operate the crane at an instant in time to lift an object from the retractable supports, and about simultaneously operate the actuator system to lower the retractable supports relative to the deck at the instant in time to the third height in the heave direction at a lowering speed. In this embodiment, the operator functions as the claimed detector. He may also view the output values of the detector and, when these values are subject to a sudden change, operate the actuator system in response to the detector output.

In a useful embodiment of the invention, the device further comprises a control system configured to generate control signals for the actuator system in response to the detector output. In particular, such control system may be configured to generate control signals for the actuator system that cause the retractable supports to lower relative to the deck at an instant in time of lifting to a third height in the heave direction at a lowering speed, in response to a detector output that is subject to a sudden change at the instant in time.

Accurate positioning of the object to be lifted may be enhanced by an embodiment of the invented device in which the vessel comprises a dynamic positioning (DP) or mooring system. Such systems, known per se, allow keeping a vessel in a relatively constant position relative to an underwater bottom and/or in a relatively constant position relative to the crane, at least within some tolerances, without using spud poles, as in a jack-up platform for instance. The mooring system may comprise a number of mooring lines, provided at one end with a suitable means for connecting to the underwater bottom or means for connecting to another structure, and at another end provided around a winch or other suitable taking in/paying out means. The number of mooring lines may be chosen conveniently between one and any number, for instance 2, 3, 4, 5, 6, 7, 8, 9, 10, or even more. The aim of the positioning system is to keep the actual position of the floating vessel relative to the underwater bottom or to the crane used for lifting within a safe distance from the position of the crane, allowing for safe lifting operations.

The device is particularly useful for lifting a foundation element of a wind turbine and providing the foundation element into an underwater bottom from a deck of a vessel, preferably a floating vessel, according to methods as elucidated in the appended claims.

A particularly useful purpose of the invention is to assist in lifting an object from a floating vessel that itself may lack a crane suitable for lifting the object, by employing a lifting crane provided on another floating or jacked-up vessel, or on any other possible support base different from the floating vessel. After having lifted the object off the floating vessel, the object may be placed directly onto or into an underwater bottom. It may however also be placed on deck of the floating vessel itself, or it may be placed onto the deck of yet another supporting platform within crane reach, which may be the deck of another floating or jack-up vessel. Another possibility is to place the object on top of a pre-installed wind turbine generator (WTG) part, or on a quay wall, jetty, oil rig platform, and the like.

Another aspect of the invention indeed relates to a method for lifting an elongated object from a deck of a vessel subject to movements in a heave direction, the method comprising:
  supporting the object to be lifted at a first height in the heave direction relative to the deck on rigid supports provided on the deck of the vessel;
  bringing retractable supports provided on the deck of the vessel at a second height relative to the deck, which second height is larger than the first height, in order to take over support of the object from the rigid supports;
  taking up the object with a lifting crane from the retractable supports at the second height; and
  activating the actuator system to lower the retractable supports towards the deck in the heave direction to a third height relative to the deck at the instant in time the object is lifted from the retractable supports, the third height being smaller than the second height.

An embodiment of the invented method further comprises lowering the object onto and into the underwater bottom, and decoupling the object from the lifting crane. As mentioned above, the method may also comprise lowering the object onto any other support base, such as on deck of the vessel that accommodates the lifting crane, or on deck of another platform that is not necessarily under water but can also be above water, such as a pre-installed foundation, another jack-up vessel or a quay wall for instance.

Another useful embodiment of the method further comprises determining the instant in time at which the object is to be lifted by monitoring the periodic movements of the vessel in the vertical direction. The instant in time at which the object is to be lifted preferably corresponds to a maximum height of the vessel in the vertical direction at the object's location.

Another useful embodiment of the method comprises determining the instant in time at which the object is lifted from the retractable supports by a detector.

Yet other useful embodiments of the method are those wherein the rigid supports are connected to the deck and the movement of an object supported by the rigid supports relative to the deck is substantially prevented in the sway and surge directions; wherein the second height of the retractable supports is above deck; wherein the third height of the retractable supports is above deck; wherein the difference between the first and the second height is larger than 0.5 m, more preferably larger than 1 m, more preferably smaller than 2 m, and even more preferably smaller than 1.5 m; wherein the lifting crane has a maximum lifting speed, and the actuator system lowers the surface at a lowering speed larger than 10% of the maximum lifting speed, more preferably larger than 25% of the maximum lifting speed, and even more preferably larger than 50% of the maximum lifting speed; wherein the actuator system lowers the retractable supports at a lowering acceleration substantially equal to the gravitational acceleration; wherein the distance in the heave direction between the retractable supports and a base surface, such as provided by the vessel's deck, is varied by the actuator system comprising distance-varying means provided between the retractable supports and the base surface; wherein the distance in the heave direction between the retractable supports and the base surface is varied by cylinder-piston units; wherein the base surface is moved across the deck of the vessel in at least one of the surge and sway directions; wherein the sensor measures movements imposed on the vessel at the object location and determines the optimal instant in time to start lifting operations; wherein the instant in time detector at which the object is lifted from the retractable supports is determined by a force sensor provided in the retractable supports, or by any other suitable sensor; wherein a control system generates control signals for the actuator system in response to the detector output, preferably the force sensor; and/or wherein the vessel is a floating vessel and its position is regulated by a dynamic positioning (DP) or mooring system.

It is expressly stated that the embodiments of the invention described in the present patent application can be combined in any possible combination of these embodiments, and that each embodiment can individually form the subject-matter of a divisional patent application.

BRIEF DESCRIPTION OF THE FIGURES

The invention will now be elucidated with reference to the following figures, without however being limited thereto. In the figures.

DESCRIPTION OF EXEMPLARY EMBODIMENTS

Figure 1:
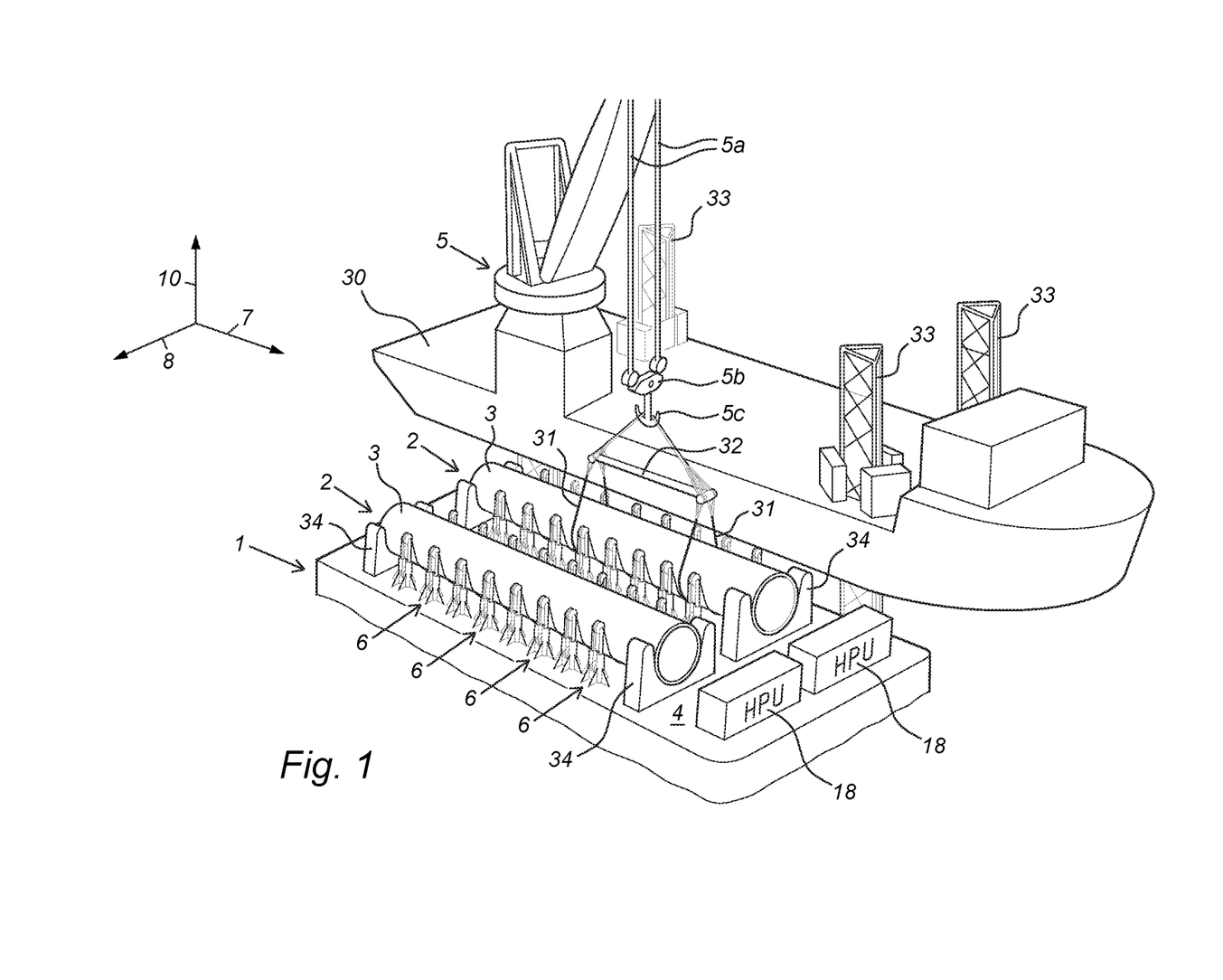
FIG. 1 represents a schematic perspective view of a floating vessel provided with objects and a device for lifting the objects according to an embodiment of the invention in which a lifting crane is operated from a jack-up platform.

Referring to FIG. 1, a vessel 1 is shown that is equipped with two devices 2 according to an embodiment of the invention. The vessel 1 is free-floating and may for instance represent a barge or platform supply vessel. The device 2 is used for assisting in lifting a monopile 3 from a deck 4 of the vessel 1.

A jack-up platform 30 is positioned next to the floating vessel 1 and supports a lifting crane 5, pivotably provided around a vertical axis on a base. The crane 5 is provided with hoisting cables 5a and, at a free outer end thereof, with a hoisting block 5b with a hook 5c, from which a monopile 3 may be suspended in use by providing the monopile 3 in slings 31, attached to the ends of a carrying frame 32. The jack-up platform 30 is stabilized with respect to the underwater bottom by spud poles 33 that rest on the underwater bottom, and the lift is preferably executed in the jacked-up position.

Figure 2:
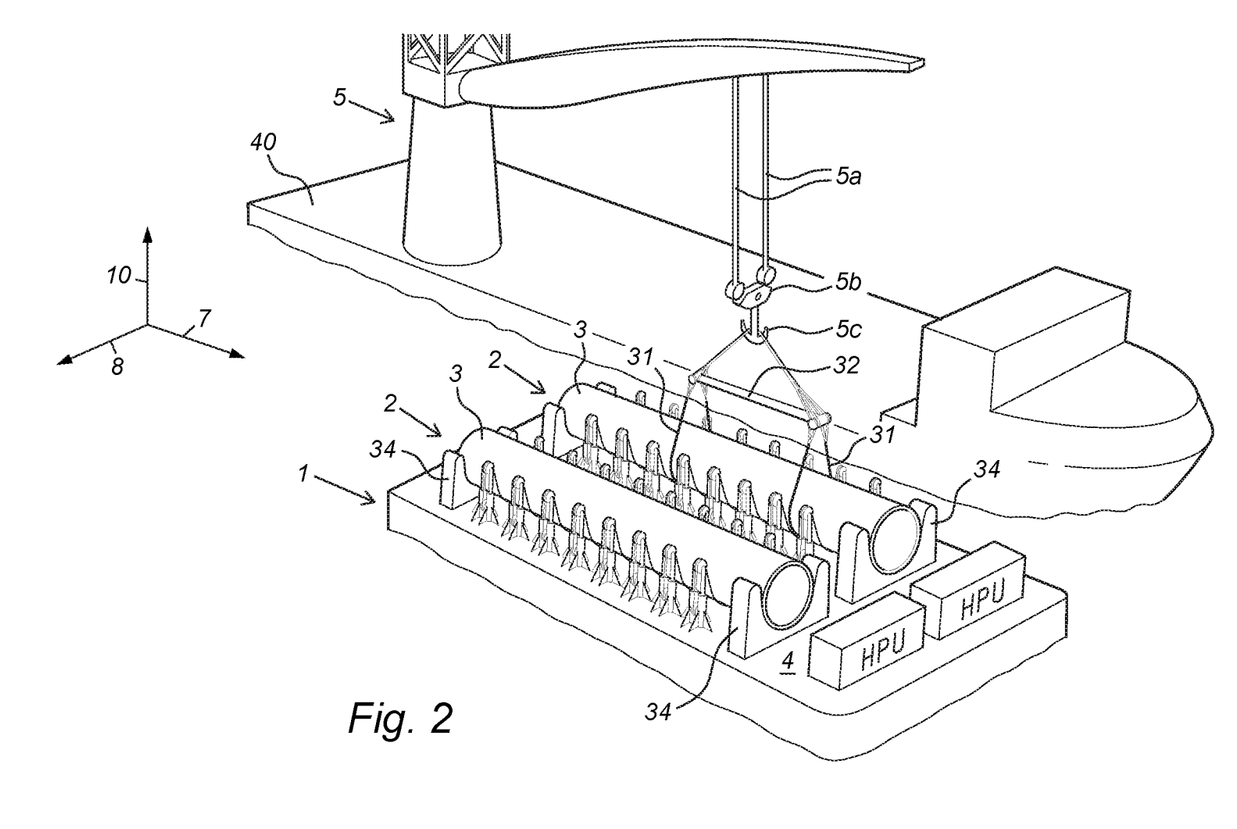
FIG. 2 represents a schematic perspective view of a floating vessel provided with objects and a device for lifting the objects according to the embodiment of FIG. 1 but in which a lifting crane is operated from another floating vessel.

FIG. 2 shows another embodiment in which the lifting crane 5 is supported by a second floating vessel 40, provided next to the floating vessel 1 on which the monopiles 3 to be lifted are stored. In the embodiment shown in FIG. 2, the vessel 40 may be equipped with a dynamic positioning and/or mooring system (not shown), known per se. The floating vessel 40 in this embodiment is able to keep control of its yaw, surge and sway motions, and limit these motions to pre-determined allowable distances. This embodiment is instrumental in further reducing the risk for damage to the lifting crane 5 during lifting of the monopile 3, since movements of the lifting crane 5 with respect to the monopiles 3 to be lifted are kept within allowable distances by the dynamic positioning and/or mooring system.

Figure 3:
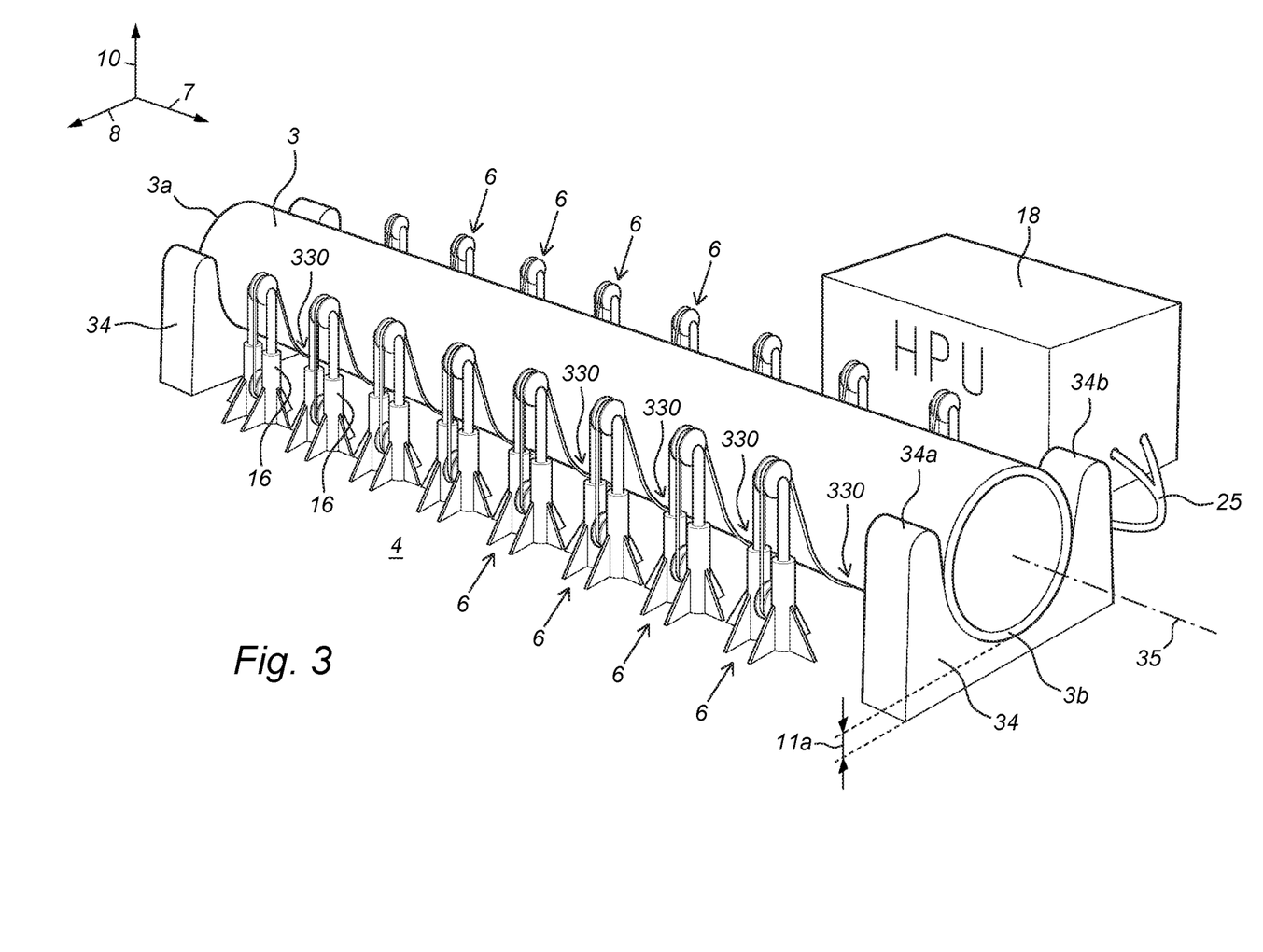
FIG. 3 represents a schematic perspective view of a device according to an embodiment of the invention provided with an object to be lifted in a position supported by the rigid supports.
Figure 4:
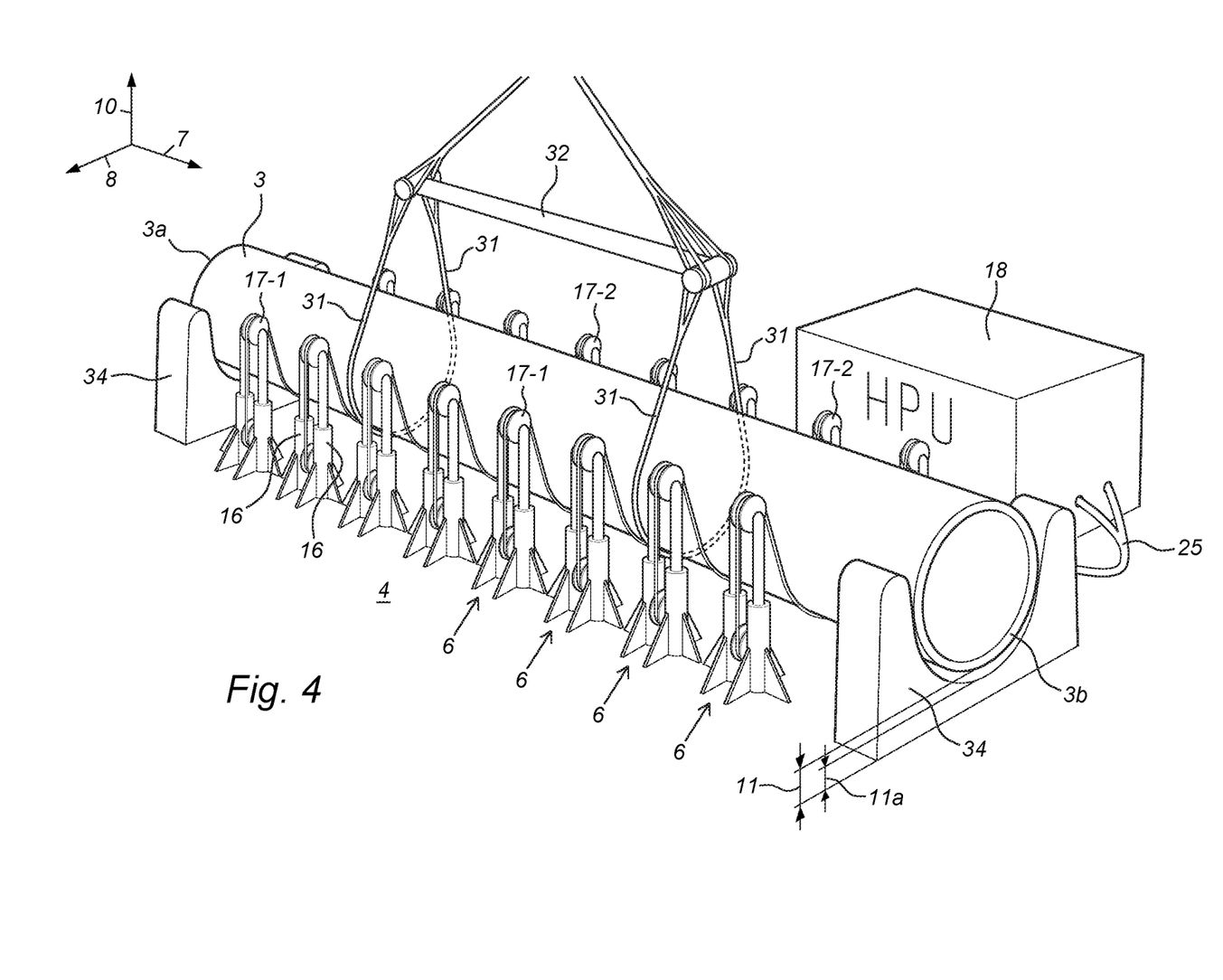
FIG. 4 represents a schematic perspective view of a device according to the embodiment shown in FIG. 3 provided with an object to be lifted in a position supported by the retractable supports.

As shown in FIGS. 3 and 4, the objects to be lifted, such as a monopile 3, is supported by a sea fastening system comprising two rigid supports 34 provided on the deck 4 of the vessel 1 at each end of the monopile 3. The rigid supports 34 are configured for supporting the monopile 3 at a first height 11a relative to the height of the deck 4. The rigid supports 34 shown are shaped such that they accommodate the substantially circular end parts (3a, 3b) of the monopile 3 during transport for instance, and before lifting, as also shown in the cross-sectional view on the left of FIG. 6.

During the transport of the floating vessel 1 a vertical upward movement of the monopile 3 may be prevented by the natural weight of the monopile 3. The rigid supports 34 may also be equipped with a temporary locking system to prevent upward movements of the monopile 3. Such a locking system may for instance comprise a pin-hole locking system (not shown), and is particularly useful when the natural weight of the monopile 3 is insufficient to prevent upward movements during transport.

A plurality of retractable supports 6 is provided between the end parts (3a, 3b) of the monopile 3. The retractable supports 6 are configured for supporting the monopile 3 at a number of support areas 330 at a second height 11 relative to the deck 4, which second height 11 is larger than the first height 11a in the heave direction 10 relative to the deck 4. The number of retractable supports 6 may be provided along a line parallel to a centerline 35 of the monopile 3, as shown. For instance, in the embodiment shown in FIGS. 1 and 2, a plurality of retractable supports 6 are aligned with the two rigid supports 34 to carry a monopile 3. This arrangement is repeated once in a sway direction 8 to obtain a second device 2 on the same vessel 1. The device(s) 2 can also be positioned in any other orientation relative to the vessel 1 its deck 4.

A device 2 according to an embodiment of the invention comprises rigid supports 34, retractable supports 6, a lifting crane 5 configured to take up the monopile 3 from the retractable supports 6 at a lifting point thereof at a lifting speed; a sensor configured to determine the optimal instant in time to start lifting operations; a detector configured to determine the instant in time at which the monopile 3 is lifted from the retractable supports 6 provided at the second height 11, and an actuator system configured to lower the retractable supports 6 relative to the deck 4 at the instant in time of lifting to a third height 12 in the heave direction 10 towards the deck 4 at a lowering speed.

Figure 5:
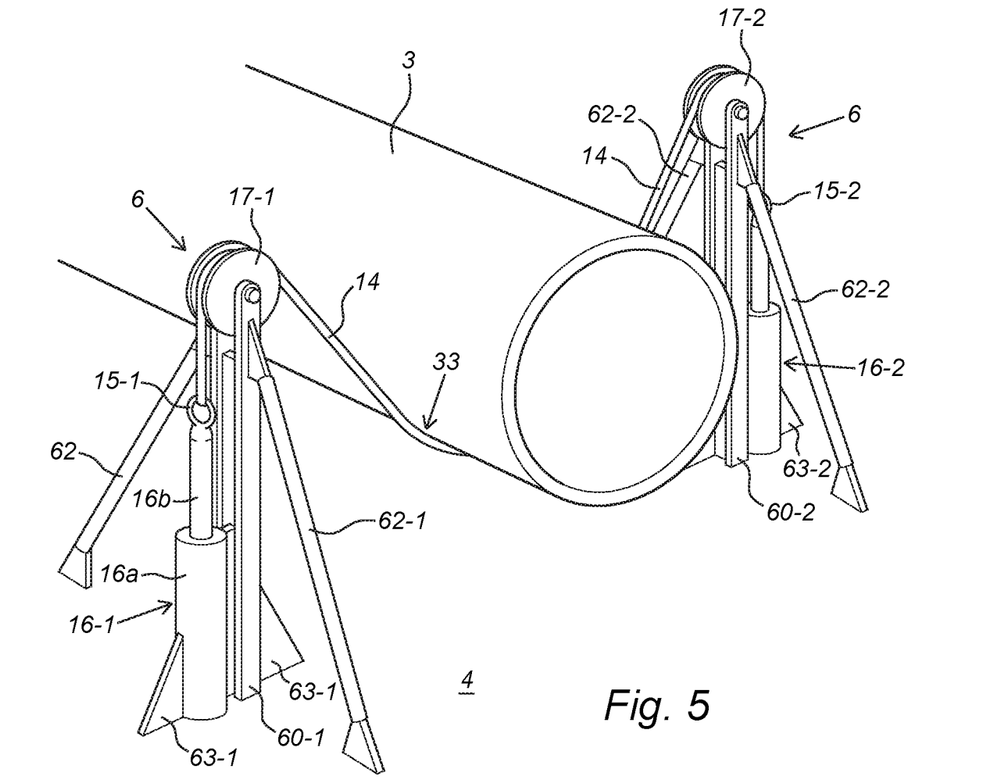
FIG. 5 represents a schematic perspective view of a pair of retractable supports according to an embodiment of the invention.

As shown in FIG. 5 for one embodiment, the retractable supports 6 each comprise a pair of posts 60 positioned at opposite sides of the centerline 35 of the monopile 3. The posts 60 are firmly welded to the deck 4 of the vessel 1 and reinforced with buttress beams 62 and plates 63. The posts 60 further comprise a cylinder-piston unit 16 that acts as distance-varying means. Each cylinder-piston unit or jack 16 has a body 16a in which a piston 16b is movable under the action of pressurized oil. A sling 14 is provided between the pair of posts 60 for supporting the monopile 3 in a circumferential support area 330. The sling 14 may be connected to a connection point 15-1 on a first post 60-1 or, as shown, at the top of the piston 16b, may run over a pulley 17-1, provided at a top end of the post 60-1, may then be provided underneath the monopile 3 and made to surface at the opposite side (of the centerline 35) of the monopile 3 to be led to a second post 60-2 of the pair of posts 60, may then run over a pulley 17-2, provided at a top end of the second post 60-2, and down to a connection point 15-2 provided at a top end of a piston 16b on said second post 60-2. In this embodiment, the monopile 3 may be brought from the first height 11a in which the monopile 3 rests on the rigid supports 34, to the second height 11 by retracting the cylinder-piston units or jacks 16 towards the deck 4. This will—in the embodiment shown—enlarge the vertical distance (in the heave direction 10) between the connection points 15 and the corresponding pulley 17 for each post 60, and will cause the sling 14 to move upwards away from the deck 4 and bring the monopile 3 to a larger second height 11. Alternatively, the sling 14 may also be lowered away from the lifted monopile 3 to a third height 12 by extending the cylinder-piston units or jacks 16 away from the deck 4 to diminish the vertical distance between the connection points 15 and the corresponding pulleys 17 for each post 60. The actuator system may be configured to lift or lower the retractable supports 6 at a lowering acceleration that is substantially equal for all retractable supports 6, which is preferred.

Figure 6:
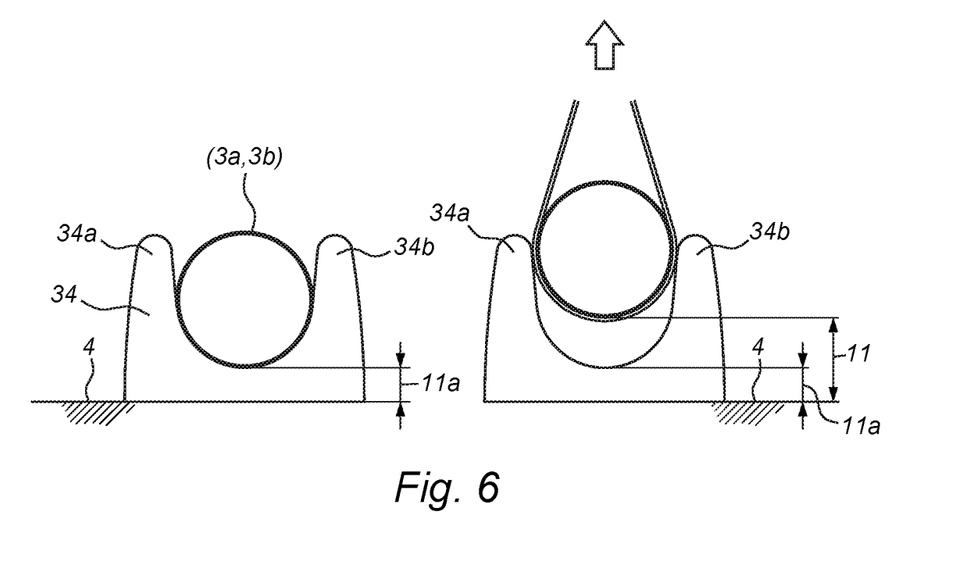
FIG. 6 represents a schematic cross-sectional front view of the rigid supports of a device according to an embodiment of the invention. The left figure is according to FIG. 3 and represents the position of the object at the first height, the right figure is according to FIG. 4 and represents the position of the object at the second height.

As shown in FIGS. 4 and 6, when the monopile 3 is being brought at a second height 11, it becomes free from the support surface provided by the rigid supports 34, at least in the heave direction 10, and the weight of the monopile 3 is carried directly on the slings 14 by the retractable supports 6. The hydraulic cylinder pistons 16 are extended somewhat in order to bring the monopile 3 from the position shown in FIG. 3 (in which the monopile 3 is held at the first height 11a) to the position shown in FIG. 4 (in which the monopile 3 is held at the second height 11). Although a carrier frame 32 with slings 31 is already applied around the monopile 3, the slings 31 are applied loosely around the monopile 3 and the weight of the monopile 3 is substantially carried by the retractable supports 6 only. Side walls (34a, 34b) are provided to the rigid supports 34 at such height as to substantially prevent movement of the monopile 3 hanging in the slings 14 relative to the deck 4 in the sway 8 and/or surge 7 directions or any non-zero acute angle of the sway 8 and/or surge 7 directions.

An actuator system is provided between the pulleys 17 and a base of the retractable supports 6, and configured to change the relative vertical position of the pulleys 17 and/or connection points 15 relative to the base, such as provided by the deck 4 of the vessel 1. The actuator system shown comprises distance-varying means in the form of the cylinder-piston units 16. A hydraulic high pressure unit (HPU) 18 provides the cylinder-piston units or jacks 16 with pressurized hydraulic oil through hydraulic hoses 25. The cylinder-piston units 16 each have a longitudinal axis that extends in the heave direction 10 to be able to vary the distance in the heave direction 10. They may also be oriented in another direction as long as a force component remains in the heave direction 10.

The difference between the second height 11, reached in an uplifted position of the retractable supports 6, and the third height 12, reached in a retracted position of the retractable supports 6, also referred to as the retractable height, may be larger than 0.5 m, more preferably larger than 1 m, and may also be restricted to smaller than 2 m, and even more preferably smaller than 1.5 m. The retractable height may be estimated from the probability of a re-hit according to known engineering practice. This probability may be quantified based on external factors, such as but not limited to a possible value loss of an object after a re-hit, and/or of the device 2 after a re-hit, and/or of the floating vessel 1 after a re-hit, and/or of the lifting crane 5 after a re-hit and/or the vessel 30 and/or 40 holding the crane 5.

Referring to FIGS. 7A to 7D, several embodiments of the retractable supports 6, or at least the retractable posts 60 thereof, are shown. The embodiment of FIG. 7A has one cylinder-piston unit 16 fastened at the cylinder side to the deck 4 of the vessel 1. The piston side connects to the sling 14 through a connection 15 provided at the end of the piston 16b.

Figures 7A, 7B:
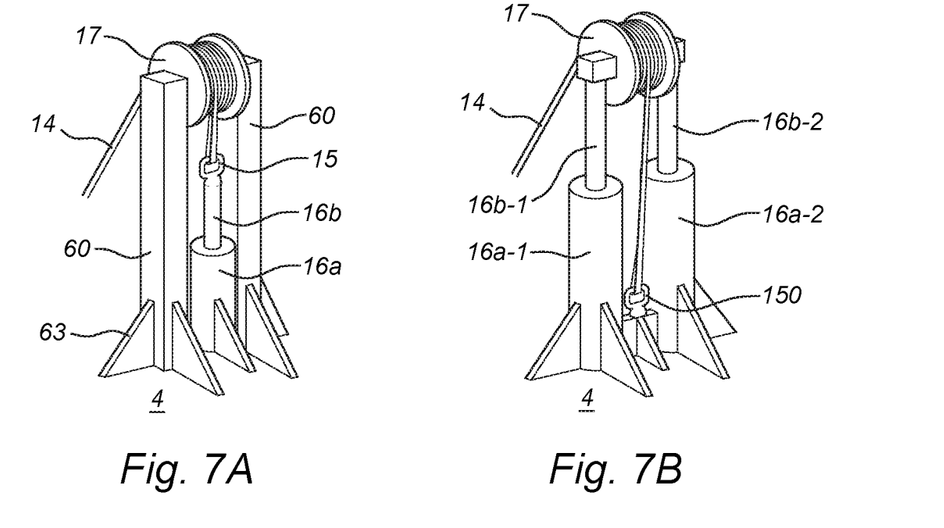
FIGS. 7A to 7D represent schematic perspective views of retractable supports in accordance with yet other embodiments of the invention.

The embodiment of FIG. 7B has two cylinder-piston units 16-1 and 16-2, fastened at each cylinder side to the deck 4 of the vessel 1. The piston sides both connect to a common pulley 17, while the sling 14 is connected to a connection 150 provided at a bottom end of the retractable support 6.

Figure 7C:
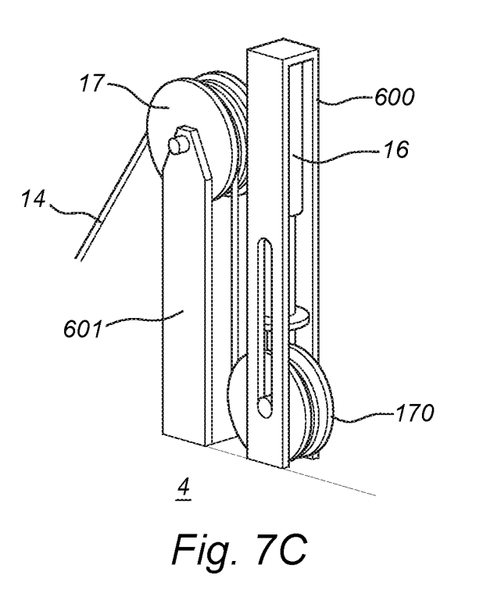

The embodiment of FIG. 7C has one cylinder-piston unit 16, provided in a post 600 which is at a bottom end provided with an extra pulley 170, that is translatable along the post 600. A sling is attached to the pulley 170 and runs over another pulley 17 provided on a second post 601, also fastened to the deck 4 of the vessel 1.

Figure 7D:
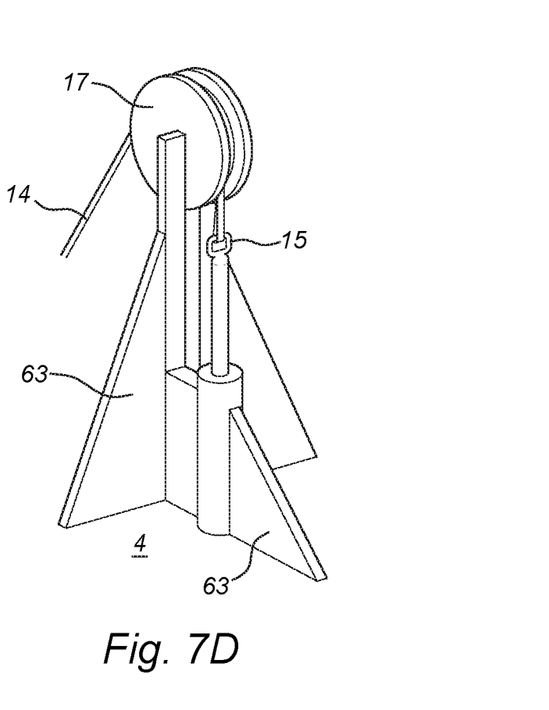

The embodiment of FIG. 7D has already been described in more detail above. The embodiments of FIG. 7 are shown for illustrative purposes only and should not be construed as limiting the invention. Many other embodiments may be envisaged that carry out the same task.

Figure 8:
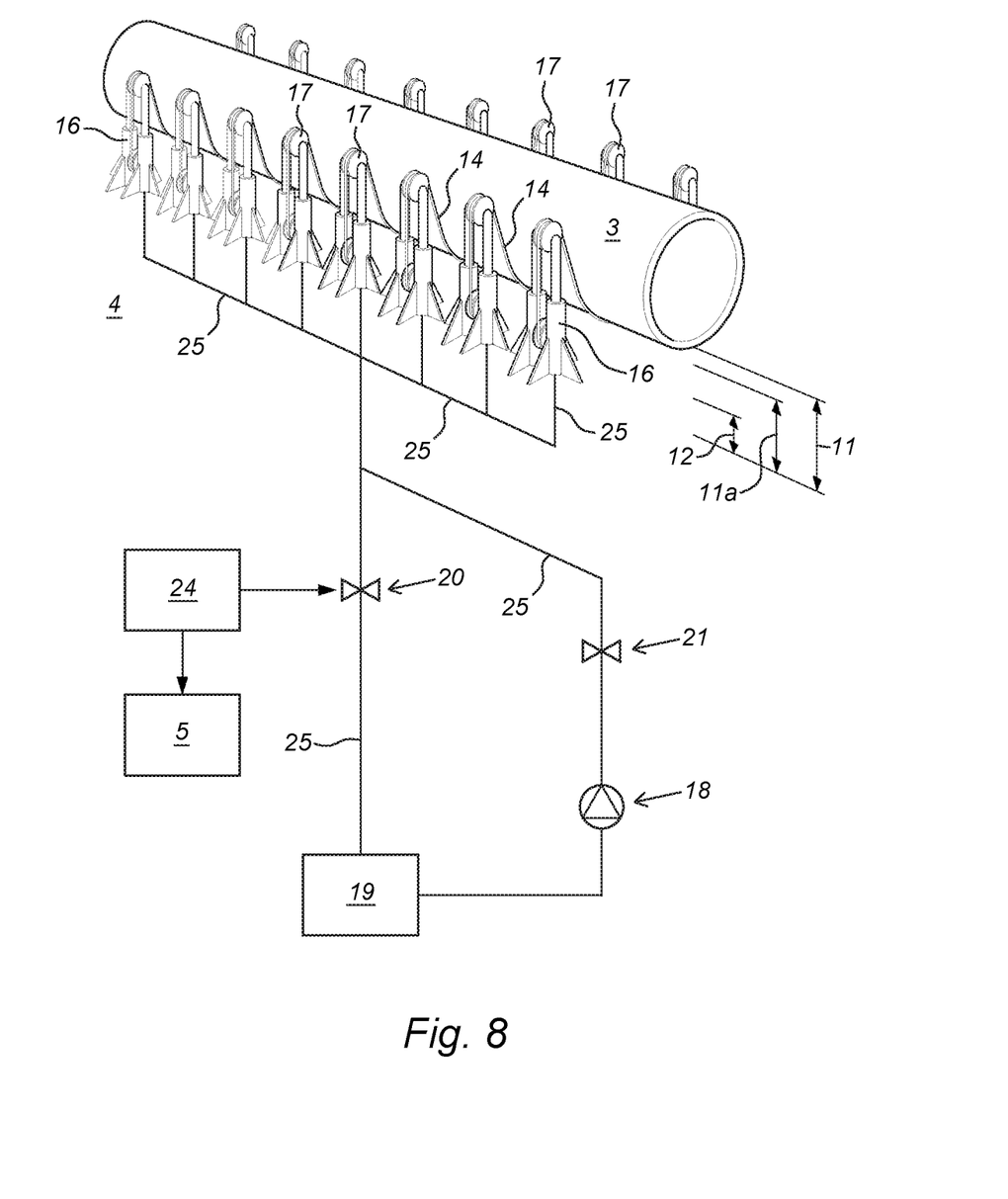
FIG. 8 represents a schematic view of an actuator control system according to an embodiment of the invention; and finally
Figure 9:
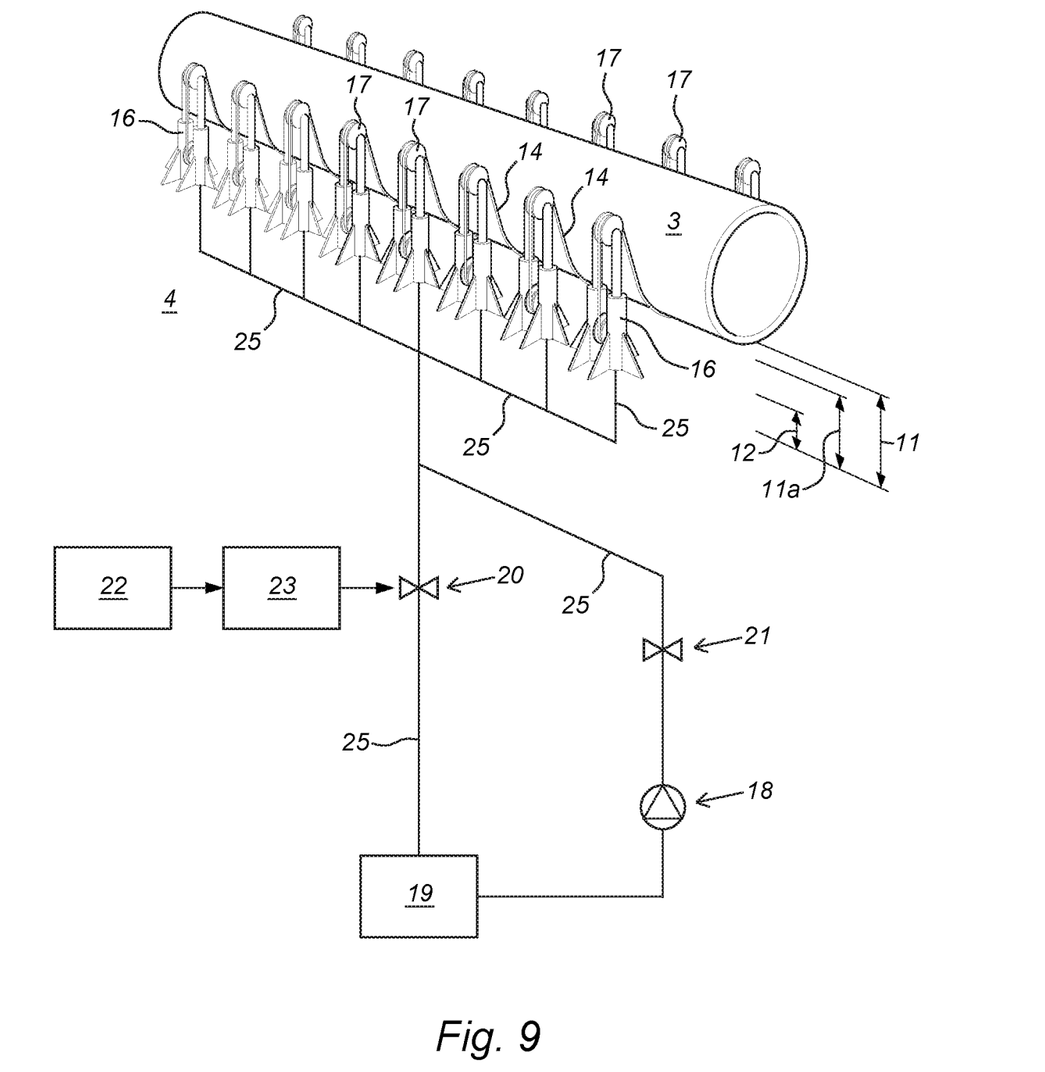
FIG. 9 represents a schematic view of an actuator control system according to another embodiment of the invention.

FIGS. 8 and 9 finally schematically show embodiments of a hydraulic circuit comprising hydraulic lines or hoses 25 linking components of the actuator system, such as the hydraulic cylinder-piston units 16. The hydraulic circuit in addition may comprise a hydraulic pump in the form of a high pressure unit (HPU) 18 to provide hydraulic pressure to the components, and valves to regulate the workings of the hydraulic circuit. The hydraulic circuit in particular comprises at least a storage unit 19 for hydraulic oil and a HPU 18 for pressurizing a lower end of the hydraulic cylinder-piston units 16, provided in the retractable supports 6. A retraction valve 20 positioned between the lower ends of the hydraulic cylinder-piston units 16 and the storage unit 19 is closed when the hydraulic cylinder-piston units 16 are pressurized and the retractable supports 6 are positioned at the second height 11 in an elevated position. After pressurizing, the HPU 18 may be closed by a pump valve 21. When opening the retraction valve 20, oil will escape from the lower ends of the hydraulic cylinder-piston units 16 into the storage unit 19 which will about instantaneously depressurize the hydraulic cylinder-piston units 16. This will cause a rapid lowering of the retractable supports 6 towards the deck 4 from the second height 11 to a third height 12 (according to the position shown in dotted line in FIGS. 8 and 9) which is closer to the deck 4 than the second height 11. The third height 12 may be about equal to the first height 11a but may also be smaller. It may even be envisaged to lower the retractable supports 6 to a position onto the deck 4. Lowering the retractable supports 6 while lifting the monopile 3 (simultaneously) reduces the risk for a re-hit, i.e. a collision of the monopile 3 with parts of the vessel, or with parts positioned on deck of the vessel 1.

The retraction valve 20 may be operated in a number of ways. Referring to FIG. 8, a human operator 24 of a lifting crane 5 may determine the instant in time at which he wants to lift the monopile 3 from the retractable supports 6 onto which it is resting. The operator 24 at the same time opens the retraction valve 20 to cause a sudden lowering of the retractable supports 6.

Another embodiment, shown in FIG. 9, uses a detector in the form of one of more force sensors 22 provided in the retractable supports 6. The force sensor 22 may detect a force when the monopile 3 is supported by the retractable supports 6. This force may decrease to a negligible or nil value when the monopile 3 has left the retractable supports 6 after the operator 24 lifted it from the supports 6. This sudden decrease of the force yields information about and/or determines the instant in time at which the monopile 3 has been lifted from the supports 6 and has left the retractable supports 6 upper surface. The force sensor 22 is coupled to a controller 23 configured to generate control signals for the actuator system in response to the force sensor's output. In particular, the controller 23 may be configured to generate a control signal to open the retraction valve 20 when the force suddenly decreases, for instance with a pre-determined amount. This will cause the retractable supports 6 to lower relative to the deck 4 to the third height 12 in the heave direction 10 at a lowering speed.

The lowering speed may typically depend on the hydraulic circuit and his components and may be designed according to engineering principles.

Before lifting of an object such as the monopile 3, the object may be rigged to the lifting crane 5. In order to be able to lift the object, it should at some point be released or un-sea fastened from the object's specific sea fastening system, i.e. the rigid supports 34. In cases such as when high operating sea states occur or when an object with a relatively high vertical center of gravity has to be lifted, the sea fastening system may not be released until a short time before the lifting of the object. Otherwise, such an object would be liable for falling onto the deck of the floating vessel, because it may not be able to withstand the movements imposed by the water and vessel. In such case, an embodiment in which the hydraulic system controlling the hydraulic jacks may also be connected to a hydraulic sea fastening system and the system programmed such that the sea fastening system will be automatically released (just) before initiating the lifting operation, and therefore (just) before the support platform(s) are retracted in a heave direction towards the deck of the vessel, is preferred. In another embodiment, a fail proof detecting system may be used also allowing a lifting crane operator to not only determine the optimal instant in time at which the lifting should take place, but also preventing him from starting any lifting in case a sensor of the fail proof system reports that the hydraulic sea fastening release system has failed. Since the lifting crane will not start the lifting of the object, the device according to the invention will also not become operative when the object is rigged to the lifting crane and the sea fastening system failed to automatically release the object.

The invention is not limited to the above described embodiments and also comprises modifications thereof, to the extent that these fall within the scope of the claims appended below.

The invention claimed is:

1. Device for lifting an elongated object from a deck of a vessel subject to movements in a heave direction, the device comprising:
    rigid supports provided on the deck of the vessel for supporting the object at a first height relative to the deck;
    retractable supports provided on the deck of the vessel for supporting the object at a second height relative to the deck, which second height is larger than the first height, the retractable supports being separate structures that are laterally spaced apart from the rigid supports;
    a lifting crane configured to take up the object from the retractable supports at the second height; and
    an actuator system configured to lower the retractable supports in the heave direction to a third height relative to the deck at an instant in time the object is lifted from the retractable supports, the third height being smaller than the second height, wherein the retractable supports are lowered at a lowering acceleration of greater than 10% of the gravitational acceleration.

2. Device according to claim 1, further comprising a detector configured to determine the instant in time at which the object is lifted from the surface.

3. Device according to claim 2, wherein the detector comprises a force sensor provided in the retractable supports.

4. Device according to claim 2, further comprising a control system configured to generate control signals for the actuator system in response to the detector output.

5. Device according to claim 1, wherein the rigid supports are connected to the deck such as to substantially prevent movement of the object provided at the second height relative to the deck in sway and surge directions of the vessel.

6. Device according to claim 1, wherein the third height of the retractable supports is above deck.

7. Device according to claim 1, wherein the rigid supports are provided to support end parts of the object, and the retractable supports are provided in positions between the rigid supports.

8. Device according to claim 1, wherein the lifting crane has a maximum lifting speed, and the actuator system is configured to lower the retractable supports at a lowering speed larger than 10% of the maximum lifting speed.

9. Device according to claim 1, wherein the actuator system is configured to lower the retractable supports at a lowering acceleration, substantially equal for all retractable supports.

10. Device according to claim 9, wherein the actuator system comprises distance-varying means provided between the retractable supports and a base surface, and configured to vary the distance in the heave direction between the retractable supports and the base surface.

11. Device according to claim 10, wherein the distance-varying means comprise cylinder-piston units.

12. Device according to claim 1, wherein the distance-varying means are incorporated in the posts.

13. Device according to claim 1, wherein components of the actuator system are interlinked by a hydraulic system comprising a high pressure pump unit and/or an accumulator.

14. Device according to claim 1, wherein the vessel is a floating vessel and the lifting crane is operated from a second distinct vessel, wherein the second vessel is a jack-up platform.

15. Device according to claim 1, wherein the object comprises a foundation element of a wind turbine.

16. Device according to claim 1, wherein the retractable supports each comprise a pair of posts positioned at opposite sides of a centerline of the object, and carrying a sling provided between the pair of posts for supporting the object.

17. Method for lifting an object from a deck of a vessel subject to movements in a heave direction, the method comprising:
supporting the object to be lifted at a first height in the heave direction relative to the deck on rigid supports provided on the deck of the vessel;
bringing retractable supports provided on the deck of the vessel at a second height relative to the deck, which second height is larger than the first height, in order to take over support of the object from the rigid supports, the retractable supports being separate structures that are laterally spaced apart from the rigid supports;
taking up the object with a lifting crane from the retractable supports at the second height; and
activating the actuator system to lower the retractable supports towards the deck in the heave direction to a third height relative to the deck at the instant in time the object is lifted from the retractable supports, the third height being smaller than the second height, wherein the retractable supports are lowered at a lowering acceleration of greater than 10% of the gravitational acceleration.

18. Method according to claim 17, further comprising lowering the object onto and into the underwater bottom; and decoupling the object from the lifting crane.

19. Method according to claim 17, further comprising determining the instant in time at which the object is to be lifted by monitoring the periodic movements of the vessel in the vertical direction.

20. Method according to claim 19, wherein the instant in time at which the object is to be lifted corresponds to a maximum height of the vessel at the object's location in the vertical direction.

21. Method according to claim 17, further comprising determining the instant in time at which the object is lifted from the retractable supports by a detector.

* * * * *